US005908888A

United States Patent [19]
Nakamura et al.

[11] Patent Number: 5,908,888
[45] Date of Patent: Jun. 1, 1999

[54] LIQUID SILICONE RUBBER COMPOSITION FOR LUBRICANT SEAL

[75] Inventors: Akito Nakamura; Yuichi Tsuji, both of Chiba Prefecture, Japan

[73] Assignee: Dow Corning Toray Silicone Co., LTD., Tokyo, Japan

[21] Appl. No.: 08/653,738

[22] Filed: May 23, 1996

[30] Foreign Application Priority Data

May 24, 1995 [JP] Japan .................................... 7-149402

[51] Int. Cl.$^{6}$ ........................................................ C08K 3/18

[52] U.S. Cl. .......................... 524/433; 523/211; 524/436; 524/779; 524/862

[58] Field of Search .................................... 524/862, 433, 524/436, 779; 523/211

[56] References Cited

U.S. PATENT DOCUMENTS

| | | | |
|---|---|---|---|
| 3,839,266 | 10/1974 | Bargain | 260/37 |
| 4,604,424 | 8/1986 | Cole et al. | 524/862 |
| 4,608,395 | 8/1986 | Hamada et al. | 528/15 |
| 4,640,956 | 2/1987 | Toub et al. | 524/779 |
| 4,681,913 | 7/1987 | Evans et al. | 524/862 |
| 5,082,886 | 1/1992 | Jeram et al. | 524/403 |
| 5,135,960 | 8/1992 | Higuchi et al. | 528/15 |

FOREIGN PATENT DOCUMENTS

| | | |
|---|---|---|
| 0-572-148A2 | 5/1993 | European Pat. Off. . |
| 76055 | 5/1982 | Japan . |

*Primary Examiner*—Melvyn I. Marquis
*Attorney, Agent, or Firm*—William F. Boley; Jennifer S. Warren

[57] ABSTRACT

A liquid silicone rubber composition for a lubricant seal having after it is cured high resistance to lubricant, with high stability displayed even in lubricant that has been subjected to thermal and oxidative degradation, and having its rubber elasticity well maintained. The liquid silicone rubber composition for a lubricant seal comprises the following ingredients: (A) an organopolysiloxane containing 2 or more silicon-atom-bonded alkenyl groups in each molecule; (B) an inorganic filler; (C) an oxide or hydroxide of an alkaline-earth metal with an atomic weight of 40 or greater; (D) an organohydrogensiloxane containing 3 or more silicon-atom-bonded hydrogen atoms in each molecule; and (E) a platinum-type catalyst.

9 Claims, No Drawings

LIQUID SILICONE RUBBER COMPOSITION FOR LUBRICANT SEAL

BACKGROUND OF INVENTION

This invention pertains to a liquid silicone rubber composition for a lubricant seal. More specifically, this invention pertains to a liquid silicone rubber composition for a lubricant seal, characterized by the fact that it has high stability against lubricant that has been subjected to thermal and oxidative degradation.

Silicone rubber has high heat resistance, high cold resistance, and low compression set. Consequently, it is widely used to form seals for use in automobiles, ships, and industrial machines. For the various types of seals, including rocker cover seals, oil pan seals, oil filter seals, shaft seals, and other seals in direct contact with lubricant, the resistance to lubricant that has been degraded by heat and oxidation should be high. That is, these seals are required to display high stability to the acid components generated by the degradation of the lubricant, to residues of various additives, and to oxygen dissolved in the lubricant. Conventional silicone rubber does not have as good of stability in such an environment as is sometime desired.

In consideration of this problem, various methods have been used in efforts to increase the oil resistance of the silicone rubber composition by adding various types of basic substances into it. For example, Japanese Kokai Patent Application No. Sho 57[1982]-76055 discloses a method in which magnesium oxide powder is added into a silicone rubber composition that is cured by a condensation reaction so as to obtain a silicone rubber composition which can be cured at room temperature and which has a high oil resistance. Also, Japanese Kokai Patent Application No. Hei 3[1991]-149260 discloses a method in which magnesium oxide powder is added into a silicone rubber composition that is cured in the presence of a platinum catalyst so as to obtain a silicone rubber composition with a high oil resistance.

However, for the silicone rubber prepared using the first-mentioned method, a long curing time is needed at room temperature to obtain the silicone rubber. The workability is thus poor, and the obtained silicone rubber has low mechanical strength.

For the latter method, when a large amount of magnesium oxide powder is added, a highly basic substance, the platinum catalyst may be poisoned. In addition, in the presence of the organohydrogenpolysiloxane, the composition may begin to cure during storage. Even when the material is stored as a 2-part liquid system, it is still impossible to guarantee a high storage stability and a long pot life, and it is impossible to increase the amount of the magnesium oxide powder added. Consequently, high oil resistance cannot be realized and therefore the durability of the cured silicone elastomer is poor when used under the severe conditions of thermally and oxidatively degraded lubricants.

The purpose of this invention is to provide a type of liquid silicone rubber composition for a lubricant seal characterized by having good storage stability and long pot life before curing, and after it is cured having good stability and ability to maintain good rubber elasticity even in the presence of lubricant that has been subjected to thermal and oxidative degradation.

SUMMARY OF INVENTION

A liquid silicone rubber composition curable to form a lubricant seal having a high resistance to physical properties degradation, such as elasticity, when contacted with lubricants including lubricants which have been subjected to thermal and oxidative degradation. The liquid silicone rubber composition for a lubricant seal comprises the following ingredients: (A) an organopolysiloxane containing 2 or more silicon-atom-bonded alkenyl groups in each molecule; (B) an inorganic filler; (C) an oxide or hydroxide of an alkaline-earth metal with an atomic weight of 40 or greater; (D) an organohydrogensiloxane containing 3 or more silicon-atom-bonded hydrogen atoms in each molecule; and (E) a platinum-type metal catalyst.

DESCRIPTION OF INVENTION

The present invention is a liquid silicone rubber composition for a lubricant seal comprising the following ingredients:

(A) 100 parts by weight of organopolysiloxane containing 2 or more silicon-atom-bonded alkenyl groups in each molecule;

(B) 5 to 150 parts by weight of inorganic filler;

(C) 7 to 50 parts by weight of an oxide or hydroxide of an alkaline-earth metal with an atomic weight of 40 or greater;

(D) an organohydrogensiloxane containing 3 or more silicon-atom-bonded hydrogen atoms in each molecule in an amount providing a molar ratio of the silicon-atom-bonded hydrogen atoms in this ingredient to the silicon-atom-bonded alkenyl groups in ingredient (A) is in the range of 0.4:1 to 5:1; and (E) a platinum-type metal catalyst in an amount providing 0.1 to 500 parts by weight of platinum-type metal per 1 million parts by weight of ingredient (A).

Ingredient (A), the organopolysiloxane, used in this invention is the principal ingredient of the present composition. In order to ensure that the silicone rubber composition of this invention can display rubber elasticity after curing, it is necessary that 2 or more alkenyl groups be present in each molecule of the organopolysiloxane. Examples of alkenyl groups that can be used include vinyl, allyl, and propenyl. Examples of organic groups other than alkenyl groups include methyl, ethyl, propyl, and other alkyl groups; phenyl, tolyl, and other aryl groups; 3,3,3-trifluoropropyl, 3-chloropropyl, and other halogenated alkyl groups; and other optionally substituted monovalent hydrocarbon groups.

The molecular configuration of this ingredient may be a straight-chained form, a branch-containing straight-chained form, or a cyclic form. The straight-chained form is preferred. There is no special limitation on the viscosity of this ingredient. In order to ensure that the cured product is a rubber-like elastic body, the viscosity of this ingredient at 25° C. is preferably 100 cP or higher. Examples of this ingredient include dimethylpolysiloxane with both ends blocked by dimethylvinylsiloxy groups, dimethylsiloxane/methylvinylsiloxane copolymer with both ends blocked by dimethylvinylsiloxy groups, dimethylsiloxane/methylvinylsiloxane copolymer with both ends blocked by trimethylsiloxy groups, and dimethylsiloxane/methylphenylsiloxane copolymer with both ends blocked by dimethylvinylsiloxy groups. According to this invention, it is possible to use two or more types of the aforementioned organopolysiloxanes in combination.

Ingredient (B), the inorganic filler, is used to reinforce the silicone rubber, adjust the viscosity, increase the heat resistance, increase the flame retardancy, etc. There is no special limitation on the inorganic filler, and any conventional one can be used. Examples of the inorganic fillers that can be used include fumed silica, precipitated silica, sintered silica, fumed titanium oxide, and other reinforcing fillers; crushed fused silica, diatomaceous earth, asbestos, iron oxide, aluminum oxide, aluminosilicic acid, calcium carbonate, and other nonreinforcing fillers; as well as fillers prepared by treating the aforementioned fillers using an organosilane, organopolysiloxane, or other organic silicon compound. The amount of this ingredient added depends on the inorganic filler used. Usually, the amount of this ingredient is in the range of 5 to 150 parts by weight per 100 parts by weight of ingredient (A).

Ingredient (C) used in this invention, the oxide or hydroxide of an alkaline-earth metal with an atomic weight of 40 or greater, is the ingredient characteristic of this invention. This ingredient is added to ensure that the cured product of the composition of this invention has a high stability in degraded oil. That is, a high stability against the chemical species caused by the acid components generated by the degradation of the oil component, residues of the various types of additives present in the oil, and dissolved oxygen present in the oil. Examples of the oxides and hydroxides of alkaline-earth metals include the oxides and hydroxides of calcium, strontium, and barium. They may be used either alone or as a mixture of two or more. Also, they may be used in the form of fine powders so as to ensure their effective dispersion in the silicone composition. Among them, calcium hydroxide and calcium oxide are preferred. The amount of this ingredient with respect to 100 parts by weight of ingredient (A) should be in the range of 7 to 50 parts by weight, or preferably in the range of 10 to 40 parts by weight. If the amount is smaller than 7 parts by weight, the composition of this invention fails to display high enough resistance to the degraded oil. On the other hand, if the amount is over 50 parts by weight, the viscosity of the composition of this invention becomes too high making handling difficult and decreasing the strength of the cured rubber product.

Ingredient (D) used in this invention, the organohydrogensiloxane containing 3 or more silicon-atom-bonded hydrogen atoms in each molecule, is a crosslinking agent. Examples of the organohydrogensiloxanes that can be used include methylhydrogenpolysiloxane with both ends blocked by trimethylsiloxy groups, dimethylsiloxane/methylhydrogensiloxane copolymer with both ends blocked by trimethylsiloxy groups, methylphenylsiloxane/methylhydrogensiloxane copolymer with both ends blocked by dimethylphenylsiloxy groups, cyclic methylhydrogenpolysiloxane, and a copolymer made of dimethylhydrogen siloxy units and $SiO_{4/2}$ units. The amount of the organohydrogensiloxane added should be appropriate to ensure that the molar ratio of the silicon-atom-bonded hydrogen atoms in this ingredient to the silicon-atom-bonded alkenyl groups in ingredient (A) is in the range of 0.4:1 to 5:1. Otherwise, it is impossible to obtain good curing properties.

Ingredient (E) used in this invention, the platinum-type metal catalyst, is a catalyst for curing the composition of this invention. Examples of useful catalysts include fine platinum powder, platinum black, chloroplatinic acid, platinum tetrachloride, olefin complexes of chloroplatinic acid, alcohol solutions of chloroplatinic acid, complexes of chloroplatinic acid and alkenylsiloxanes, rhodium compounds, and palladium compounds. The amount of the platinum-type metal catalyst added is usually in the range of 0.1 to 500 parts by weight of platinum-type metal atoms per 1 million parts by weight of ingredient (A). If the amount is smaller than 0.1 part by weight of platinum-type metal, the curing reaction may not proceed sufficiently; if the amount is over 500 parts by weight of platinum-type metal, the cost effectiveness is poor.

Ingredient (E) is preferably in the form of a spherical-shaped fine-grain catalyst comprising a thermoplastic resin containing 0.01 wt % or more platinum metal atoms. Also, in order to ensure that the platinum-type metal catalyst ingredient can be dispersed fast in the composition at the conventional molding temperature, the softening point of the thermoplastic resin should be in the range of 50 to 150° C., and the average grain size of the spherical-shaped fine-grain catalyst is in the range of 0.01 to 10 mm.

The composition of this invention can be manufactured easily by uniformly blending ingredients (A) through (E), as well as various additives as demanded, such as heat resistance agents, flame-retarding agents, and pigments by means of a kneader mixer, a pressurized kneader mixer, Ross mixer, and other blenders. The composition may also be prepared as two or more liquids, which are blended right before use, so as to facilitate manufacturing and to improve the workability.

In the following, this invention will be explained in more detail with reference to specific examples. In the examples, the parts refer to the parts by weight and the viscosity refers to the value at 25° C.

EXAMPLE 1

100 parts of a dimethylpolysiloxane (with vinyl group content of 0.23 wt %) that has both ends of the molecular chain blocked by dimethylvinylsiloxy groups and has a viscosity of 2,000 cP, 13 parts of crushed fused silica with an average grain size of 5 $\mu$m, and 30 parts of fumed silica that has been surface-treated with dimethyldichlorosilane and has a specific surface area of 200 $m^2/g$ were blended until the mixture became homogeneous. After heat treatment under vacuum of the mixture, 12 parts of finely powdered calcium hydroxide were added, followed by blending to homogeneity to form a flowable liquid silicone rubber base.

Then, 100 parts of the liquid silicone rubber base were blended uniformly with the following ingredients to form a liquid silicone rubber composition: 1.7 parts of dimethylsiloxane/methylhydrogensiloxane copolymer (with 0.8 wt % silicon-atom-bonded hydrogen atoms), 0.3 part of spherical-shaped fine-grain catalyst comprising thermoplastic resin containing a complex of chloroplatinic acid and tetramethyldivinylsiloxane in an amount corresponding to 0.4 wt % of platinum metal atoms (product of Toray Dow Corning Silicone Co., Ltd., with an average grain size of 1.1 $\mu$m and a softening point of the thermoplastic resin of 85° C.), and 0.01 part of 3,5-dimethyl-1-hexyn-3-ol as curing inhibitor.

The silicone rubber composition was press molded at 150° C. for 5 minutes to form rubber sheet specimens for measurement of properties as defined in JIS K 6301. The initial properties were then measured (time=0). Then, the resistance of the specimens against degraded oil (a lubricant that had been degraded by heat and oxidation) was measured. The resistance to degraded oil was measured by the following method: automotive engine oil (a product of Toyota Motor Corp.; commercial name: Castle Motor Oil Clean SG 10W-30) was used to fill 75% of the interior volume of pressure-proof container. After the specimens were placed in the oil, oxygen gas was filled at a pressure of 10 $kg/cm^2$ to occupy the remaining space of the container. The container was sealed and placed in an oven at 150° C.

for heating. The container was taken out from the oven every 24 hours and refilled with oxygen under a pressure of 10 $kg/cm^2$ at room temperature and replaced in the oven. After this operation had been carried out repeatedly for prescribed times (time=72, 240, or 360 hours), the specimens were taken out of the degraded oil and the physical properties were measured.

For comparison, a silicone rubber composition was prepared in the same way as above, except that instead of the finely powdered calcium hydroxide, crushed fused silica with an average grain size of 5 $\mu$m was used. Then, the physical properties were measured as described above. The results are listed in Table I.

TABLE I

Results of Test of Resistance to Degraded Oil

| | | Elastomer | |
|---|---|---|---|
| Time (h) | Property | Test | Comparison |
| 0 | Hardness (JIS A) | 52 | 52 |
| | Tensile ($Kgf/cm^2$) | 44 | 54 |
| | Elongation (%) | 260 | 320 |
| 72 | Hardness (JIS A) | 40 | 39 |
| | Tensile ($Kgf/cm^2$) | 37 | 41 |
| | Elongation (%) | 200 | 210 |
| 240 | Hardness (JIS A) | 37 | 10 |
| | Tensile ($Kgf/cm^2$) | 35 | 13 |
| | Elongation (%) | 210 | 350 |
| 360 | Hardness (JIS A) | 36 | 2 |
| | Tensile ($Kgf/cm^2$) | 30 | 1 |
| | Elongation (%) | 260 | 100 |

EXAMPLE 2

A silicone rubber composition was prepared in the same way as described in Example 1, except that instead of the finely powdered calcium hydroxide used in Application Example 1, 12 parts of finely powdered calcium oxide were used. The physical properties of the cured specimens were measured in the same way as in Example 1. For comparison, a silicone rubber composition was prepared in the same way as above, except that the amount of the finely powdered calcium oxide was reduced to 5 parts. The physical properties of the cured specimens were also measured in the same way as described above. The results for these tests are listed in Table II.

TABLE II

Results of Test of Resistance to Degraded Oil

| | | Elastomer | |
|---|---|---|---|
| Time (h) | Property | Test | Comparison |
| 0 | Hardness (JIS A) | 48 | 50 |
| | Tensile ($Kgf/cm^2$) | 49 | 51 |
| | Elongation (%) | 350 | 310 |
| 72 | Hardness (JIS A) | 40 | 39 |
| | Tensile ($Kgf/cm^2$) | 44 | 42 |
| | Elongation (%) | 270 | 200 |
| 240 | Hardness (JIS A) | 31 | 19 |
| | Tensile ($Kgf/cm^2$) | 38 | 27 |
| | Elongation (%) | 270 | 290 |
| 360 | Hardness (JIS A) | 28 | 7 |
| | Tensile ($Kgf/cm^2$) | 22 | 9 |
| | Elongation (%) | 300 | 370 |

EXAMPLE 3

85 parts of dimethylpolysiloxane (with a vinyl group content of 0.23 wt %) that had both ends of the molecular chain blocked by dimethylvinylsiloxy groups and a viscosity of 2,000 cP, 15 parts dimethylsiloxane/methylvinylsiloxane copolymer (with vinyl group content of 0.52 wt %) with both ends of the molecular chain blocked by trimethylsiloxy groups and a viscosity of 40,000 cP, 30 parts of crushed fused silica with average grain size of 5 $\mu$m, 30 parts of fumed silica with a specific surface 1 area of 200 $m^2/g$, 5 parts of hexamethyldisilazane, and 2 parts water were uniformly blended and heat treated under vacuum. Then, 20 parts of finely powdered calcium hydroxide were added, and the mixture was blended until it became homogeneous, forming a flowable liquid silicone rubber base.

Then, 100 parts of the obtained liquid silicone rubber base were blended uniformly with the following ingredients to form a liquid silicone rubber composition: 1.7 parts of dimethylsiloxane/methylhydrogensiloxane copolymer (with 0.8 wt % silicon-atom-bonded hydrogen atoms), 0.3 part of spherical-shaped fine-grain catalyst of thermoplastic resin containing a complex of chloroplatinic acid and tetramethyldivinylsiloxane in an amount corresponding to 0.4 wt % of the platinum metal atoms (product of Toray Dow Corning Silicone Co., Ltd., with an average grain size of 1.1 $\mu$m and a softening point of the thermoplastic resin of 85° C.), and 0.01 part of 3,5-dimethyl-1-hexyn-3-ol as cure inhibitor. The physical properties of cured specimens were measured as described in Example 1.

For comparison, a silicone rubber composition was prepared in the same way as described above, except that instead of the finely powdered calcium hydroxide, crushed fused silica with an average grain size of 5 $\mu$m was used. Then, the physical properties were measured as described above. The results are listed in Table III.

TABLE III

Results of Test of Resistance to Degraded Oil

| | | Elastomer | |
|---|---|---|---|
| Time (h) | Property | Test | Comparison |
| 0 | Hardness (JIS A) | 48 | 50 |
| | Tensile ($Kgf/cm^2$) | 63 | 59 |
| | Elongation (%) | 200 | 140 |
| 72 | Hardness (JIS A) | 52 | 50 |
| | Tensile ($Kgf/cm^2$) | 55 | 55 |
| | Elongation (%) | 150 | 140 |
| 240 | Hardness (JIS A) | 41 | 22 |
| | Tensile ($Kgf/cm^2$) | 39 | 16 |
| | Elongation (%) | 170 | 200 |
| 360 | Hardness (JIS A) | 36 | 13 |
| | Tensile ($Kgf/cm^2$) | 24 | 4 |
| | Elongation (%) | 180 | 160 |

I claim:

1. A silicone rubber lubricant seal formed by curing a liquid silicone composition comprising:

(A) 100 parts by weight of organopolysiloxane containing 2 or more silicon-atom-bonded alkenyl groups in each molecule;

(B) 5 to 150 parts by weight of inorganic filler;

(C) 7 to 50 parts by weight of an oxide or hydroxide of an alkaline-earth metal with an atomic weight of 40 or greater;

(D) an organohydrogensiloxane containing 3 or more silicon-atom-bonded hydrogen atoms in each molecule, in an amount providing a molar ratio of the silicon-atom-bonded hydrogen atoms in this ingredient to the silicon-atom-bonded alkenyl groups in ingredient (A) in a range of 0.4:1 to 5:1; and (E) a platinum-type metal catalyst in an amount providing 0.1 to 500 parts by weight of platinum-type metal per 1 million parts by weight of ingredient (A).

2. The lubricant seal described in claim 1, where ingredient (C) is calcium oxide.

3. The lubricant seal described in claim 1, where ingredient (C) is calcium hydroxide.

4. The lubricant seal described in claim 1, where ingredient (E) is a spherical-shaped fine-grain catalyst comprising a thermoplastic resin containing 0.01 wt % platinum metal atoms, the softening point of the thermoplastic resin is in the range of 50–150 ° C., and the average grain size of the spherical-shaped fine-grain catalyst is in the range of 0.01 to 10 mm.

5. The lubricant seal described in claim 1, where ingredient (A) is a liquid straight-chained polymer having a viscosity at 25° C. of 100 cP or higher.

6. The lubricant seal described in claim 1, where ingredient (C) is selected from a group consisting of oxides and hydroxides of calcium, strontium, and barium.

7. The lubricant seal described in claim 1, where the amount of ingredient (C) is in the range of 10 to 40 parts by weight per 100 parts by weight of ingredient (A).

8. The lubricant seal described in claim 7, where ingredient (C) is selected from the group consisting of calcium hydroxide and calcium oxide.

9. The lubricant seal described in claim 4, where the amount of ingredient (C) is in the range of 10 to 40 parts by weight per 100 parts by weight of ingredient (A) and ingredient (C) is selected from the group consisting of calcium hydroxide and calcium oxide.

* * * * *